United States Patent [19]

Fenner

[11] Patent Number: 4,819,782
[45] Date of Patent: Apr. 11, 1989

[54] LOWER LOBE CARGO TRANSFER PLATFORM CONVEYOR SYSTEM

[75] Inventor: James A. Fenner, Renton, Wash.

[73] Assignee: The Boeing Company, Seattle, Wash.

[21] Appl. No.: 811,360

[22] Filed: Dec. 20, 1985

[51] Int. Cl.[4] .................................... B65G 37/00
[52] U.S. Cl. ............................ 198/372; 198/463.3; 198/809; 244/137.1; 414/502
[58] Field of Search .................. 198/372, 457, 463.3, 198/597, 809, 316.1; 244/137 R, 137.1; 414/502, 528, 340

[56] References Cited

U.S. PATENT DOCUMENTS

| | | | |
|---|---|---|---|
| 2,156,248 | 4/1939 | Wegner | 198/463.3 |
| 2,681,130 | 6/1954 | Atwood | 198/463.3 |
| 3,116,822 | 1/1964 | Carus | 198/463.3 |
| 3,195,710 | 7/1965 | Robinson | 198/463.3 X |
| 3,241,652 | 3/1966 | Glendy | 198/463.3 X |
| 3,493,095 | 2/1970 | Messerly | 198/457 X |
| 3,550,753 | 12/1970 | Culp | 198/809 |
| 3,612,316 | 10/1971 | Baldwin et al. | 198/809 X |
| 3,620,353 | 11/1971 | Foster et al. | 198/809 |
| 3,624,782 | 11/1971 | McPeek et al. | 414/82 |
| 3,741,504 | 6/1973 | Alberti et al. | 244/137 R |
| 3,782,536 | 1/1974 | Toney | 198/316.1 |
| 3,822,777 | 7/1974 | Jepsen | 198/457 X |
| 3,861,541 | 1/1975 | Taft et al. | 244/137 R |
| 3,877,386 | 4/1975 | Wakabayashi | 198/463.3 X |
| 3,934,707 | 1/1976 | Bowman | 198/809 X |
| 4,109,781 | 8/1978 | Moons | 198/463.3 |
| 4,149,626 | 4/1979 | Holt | 198/718 |
| 4,544,319 | 10/1985 | Folling et al. | 198/457 X |

FOREIGN PATENT DOCUMENTS

2728016 1/1979 Fed. Rep. of Germany ...... 198/457

Primary Examiner—Robert J. Spar
Assistant Examiner—P. McCoy Smith
Attorney, Agent, or Firm—Christensen, O'Connor, Johnson & Kindness

[57] ABSTRACT

A platform conveyor system (21) for changing the direction of cargo containers (27) at the entryway (17) of the lower lobe compartment (11) of an aircraft fuselage (13) includes a plurality of lateral conveyors (25a, 25b and 25c). During loading the lateral conveyors (25a, 25b and 25c) move cargo containers (27) through the entryway (17) to a position above a pair of longitudinal conveyors (33 and 35). After a cargo container (27) is positioned above the longitudinal conveyors (33 and 35), the lateral conveyors (25a, 25b and 25c) are deenergized, and the longitudinal conveyors (33 and 35) are raised and energized. The longitudinal conveyors (33 and 35) move the cargo container (27) onto another conveyor mechanism that moves the cargo container (27) to its final destination in the lower lobe compartment (11) of the aircraft fuselage (13). After the cargo container (27) leaves the platform the longitudinal conveyors (33 and 35) are lowered. During unloading, a cargo container (27) is first moved to the previously raised longitudinal conveyors (33 and 35), which move the cargo container (27) to a position above the lateral conveyors (25a, 25b and 25c). Then the longitudinal conveyors (33 and 35) are lowered and the lateral conveyors (25a, 25b and 25c) are energized to move the cargo container (27) through the entryway (17).

8 Claims, 7 Drawing Sheets

LOWER LOBE CARGO TRANSFER PLATFORM CONVEYOR SYSTEM

TECHNICAL AREA

This invention relates to conveyor systems and, more particularly, conveyor systems for sharply changing the direction of travel of items being conveyed by belts.

BACKGROUND OF THE INVENTION

While the present invention was developed for use in moving cargo containers into and out of the lower lobe compartment of an aircraft, and is described in this environment, it is to be understood that the invention can be used in other environments where it is necessary to sharply change the direction of travel of cargo being conveyed by a conveyor system, particularly environments where such a change is needed to make the maximum use of storage space.

While container systems have been developed for loading the lower lobe compartments of wide-body aircraft, traditionally, the lower lobe compartments of standard-sized aircraft have been bulk loaded. That is, in the past, the lower lobe compartment of standard-sized aircraft has been loaded by manually stacking cargo and baggage in the compartment. Manual loading has the disadvantage that it limits the size of baggage to those items that can be manhandled. Further, because manual loading is time consuming, it limits aircraft turnaround time.

While some lower lobe container loading systems have been proposed and implemented in standard-sized aircraft, in the past, such systems have been undesirable for various reasons. Some prior lower lobe container loading systems have been custom designed for compatibility with specialized containers and aircraft configurations. Such systems are, of course, not suited for widespread use. Other prior lower lobe container loading systems have simply consisted of balls and rollers located at the conveyor plane and guides and stops positioned to restrain the containers after they have been moved to a storage position. While such systems allow larger containers to be moved and positioned than those that can be manually lifted, positioning of the containers is still, primarily, the result of manual labor.

Intermodal modules for carrying cargo and/or baggage are being developed. Such modules have a right-rectangular, parallelepiped configuration, i.e., all sides are generally rectangular. The base of such modules is sized for compatibility with trucks, rail cars, shipping pallets, etc. In general, such modules are not compatible with previously developed, specialized aircraft lower lobe container loading systems. In addition, the cardboard construction of some such modules is not compatible with conveyor systems composed of balls and rollers.

As a result, there is need for a lower lobe container loading system for standard-sized aircraft that is generally universal, i.e., can be utilized in a wide variety of such aircraft.

The lower lobe compartments of standard-sized aircraft are loaded through doors located in the side of the aircraft's fuselage, below the deck of the upper (e.g., passenger) compartment. After cargo enters the lower lobe its direction of movement changes by 90° as the cargo is moved along the longitudinal axis of the aircraft to its final destination. Obviously, a lower lobe container loading system designed to receive and position the maximum-sized cargo containers in the lower lobe of a standard-sized aircraft requires a mechanism for changing the direction of container movement by 90° immediately inside of the door via which cargo containers enter and leave the lower lobe. The invention is directed to providing a transfer platform conveyor system that sharply changes the direction of cargo container movement.

SUMMARY OF THE INVENTION

In accordance with this invention, a transfer platform conveyor system for sharply changing the direction of movement of cargo containers is provided. The transfer platform conveyor system includes a lateral conveyor mechanism that includes belts that move cargo to and from a position above a longitudinal conveyor mechanism. After a cargo container is moved to a position above the longitudinal conveyor mechanism, the belts of the lateral conveyor mechanism are deenergized and belts that form part of the longitudinal conveyor mechanism are raised. Thereafter, the longitudinal conveyor mechanism belts are energized to move the cargo container in a direction transverse to the direction of movement created by the lateral conveyor mechanism. In reverse, the longitudinal conveyor mechanism belts, while raised, move a container to a position above the lateral conveyor mechanism belts. Thereafter, the longitudinal conveyor mechanism belts are deenergized and lowered. Then, the lateral conveyor mechanism belts are energized to move the container in a direction transverse to the direction of movement created by the longitudinal conveyor mechanism.

In accordance with other aspects of this invention, the lateral conveyor mechanism also includes a plurality of rollers located between the belts of the longitudinal conveyor mechanism.

In accordance with still further aspects of this invention, the belts of the longitudinal conveyor mechanism are mounted on a plurality of rollers that, in turn, are supported by frames that lie along the longitudinal edges of the belts. The frames, in turn, are supported by yokes mounted on two spaced-apart shafts that are rotated by a linear actuator mechanism. When the linear actuator mechanism rotates the shafts the yokes follow a path of travel that moves the frames and, thus, the belts between raised and lowered positions.

In accordance with still other aspects of this invention, the linear actuator mechanism includes a linear actuator connected to one of said shafts for rotating the shaft. The linear actuator mechanism also includes a link for connecting said rotated shaft to the other shaft such that said other shaft is also rotated when the first shaft is rotated.

In accordance with yet still other aspects of the invention, the transfer platform conveyor system includes a control system for controlling the energization of the linear actuator and, thus, the raising and lowering of the belts of the longitudinal conveyor mechanism. Further, the control system controls the energization of the belts of the lateral and longitudinal conveyor mechanisms. The belts are controlled such that neither can be energized when the longitudinal conveyor mechanism belts are being raised or lowered. The belts are also controlled such that the longitudinal conveyor mechanism belts cannot be energized when they are fully down and the lateral conveyor mechanism belts cannot be energized when the horizontal conveyor mechanism belts are fully up.

As can be readily appreciated from the foregoing description, the invention provides a cargo transfer platform conveyor system ideally suited for use inside the entrance to the lower lobe compartment of a standard aircraft. The transfer platform conveyor system creates a sharp (e.g., 90°) change in container movement direction. Because a 90° change of direction is achieved, maximum-sized containers can be loaded and unloaded using the invention. Further, because belt conveyors utilized, problems associated with rollers and/or balls are avoided. Also, because the invention is in the form of a platform, it is relatively universal and, thus, suitable for use in a wide variety of aircraft without requiring specialized changes to the transfer platform conveyor system and/or the aircraft.

BRIEF DESCRIPTION OF THE DRAWINGS

The foregoing and other features and advantages of the present invention will become more readily appreciated as the same becomes better understood by reference to the following detailed description, when taken in conjunction with the accompanying drawings, wherein.

DESCRIPTION OF THE PREFERRED EMBODIMENT

Figure 1:
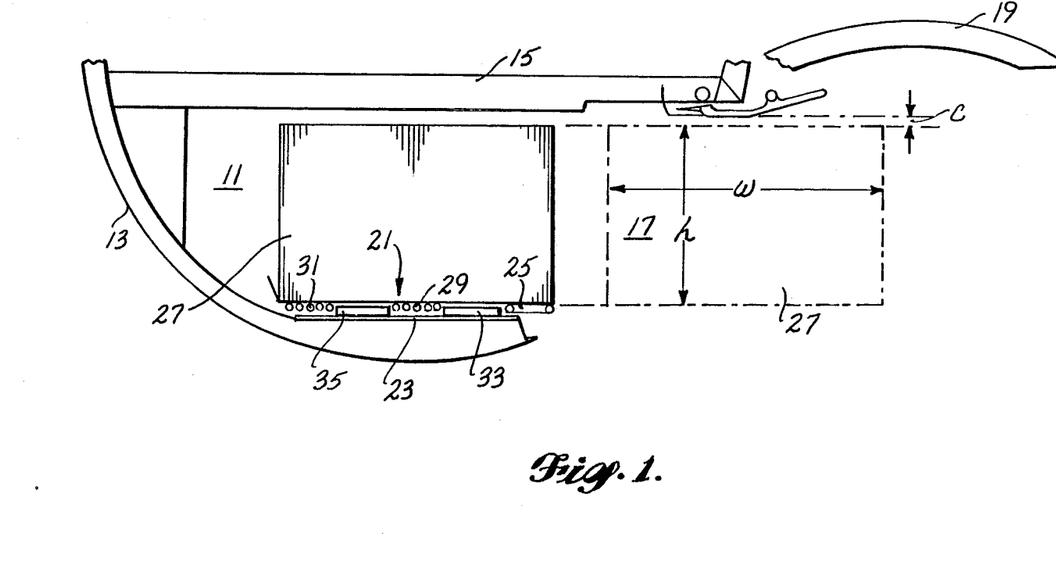
FIG. 1 is a cross-sectional view of the lower lobe compartment of a standard-body aircraft illustrating a cargo transfer platform conveyor system formed in accordance with the invention moving a container through the entryway of the lower lobe compartment.

FIG. 1 is a cross-sectional view showing the lower lobe compartment 11 of the fuselage 13 of an aircraft. In the case of a passenger aircraft, the lower lobe compartment 11 is the region of the fuselage 13 located below the passenger deck 15 of the aircraft. As shown in FIG. 1, access to the lower lobe compartment 11 is via an entryway 17 that is closed by a door 19 hinged in the region where the flight deck 15 and the fuselage meet.

As shown in FIG. 1, the door 19 is raisable to a position above the elevation of the head of the entryway 17 to allow straight horizontal access into the lower lobe compartment 11. The present invention is directed to a cargo transfer platform conveyor system 21 suitable for mounting on the floor 23 of the lower lobe compartment 11 just inside of the entryway 17. The cargo transfer platform conveyor system 21 includes a lateral belt conveyor mechanism and a longitudinal belt conveyor mechanism. The lateral belt conveyor mechanism includes a plurality of laterally oriented, spaced-apart conveyors 25 positioned immediately inwardly of the entryway 17 for receiving a cargo container 27 and moving the cargo container inwardly over mid and interior support rollers 29 and 31. The mid and interior support rollers also form part of the lateral conveyor mechanism. The longitudinal belt conveyor mechanism includes first and second longitudinal conveyors 33 and 35. The first longitudinal conveyor is located between the lateral conveyors 25 and the midrollers 29 and the second longitudinal conveyor 35 is located between the midrollers 29 and the inside rollers 31.

The longitudinal conveyors are movable between upper and lower positions. They are in the lower position when a container 27 is being moved through the entryway 17. More specifically, after a container 27 entering the lower lobe is positioned above the first and second lateral conveyors 33 and 35, the lateral conveyors are deenergized and the first and second longitudinal conveyors 33 and 35 are raised. Thereafter, the longitudinal conveyors 33 and 35 are energized to move the container 27 along the longitudinal axis of the fuselage 13. After leaving the cargo transfer platform conveyor system the container 27 is moved to its final position by other conveyor mechanisms which should not form part of the present invention. Unloading is accomplished in the opposite manner. Specifically, the other conveyor systems move the container 27 to the previously raised first and second longitudinal conveyors 33 and 35, which move the container to a position above the lateral conveyors 25 and the mid and interior support rollers 29 and 31. After this position is reached, the first and second longitudinal conveyors 33 and 35 are deenergized and, then, lowered. Thereafter, the lateral conveyors 25 are energized to move the container 27 through the entryway 17 to a position outside of the aircraft. Since the longitudinal conveyors 33 and 35 only need to raise the container 27 a slight distance to clear the lateral conveyors 25 and the mid and interior support rollers 29 and 31, the height (h) of the container 27 can be substantially the same as the height of the lower lobe compartment 11 or the height of the entryway 17, whichever is less, because only a small amount of clearance (c) is needed. The width (w) of the container is, of course, limited by the available width of the lower lobe compartment 11.

Figure 2:
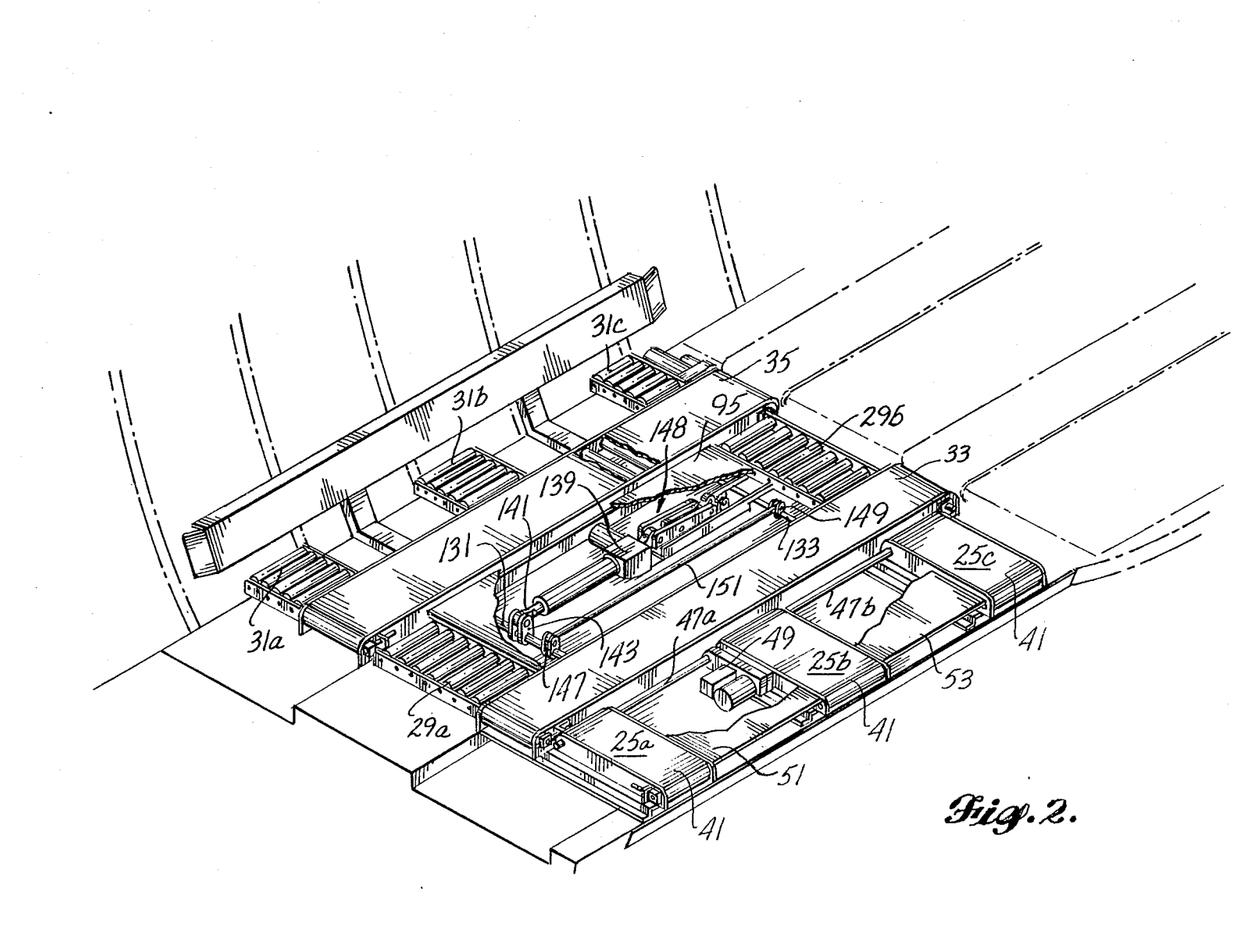
FIG. 2 is a perspective view of a lower lobe cargo transfer platform conveyor system formed in accordance with the invention.
Figure 3:
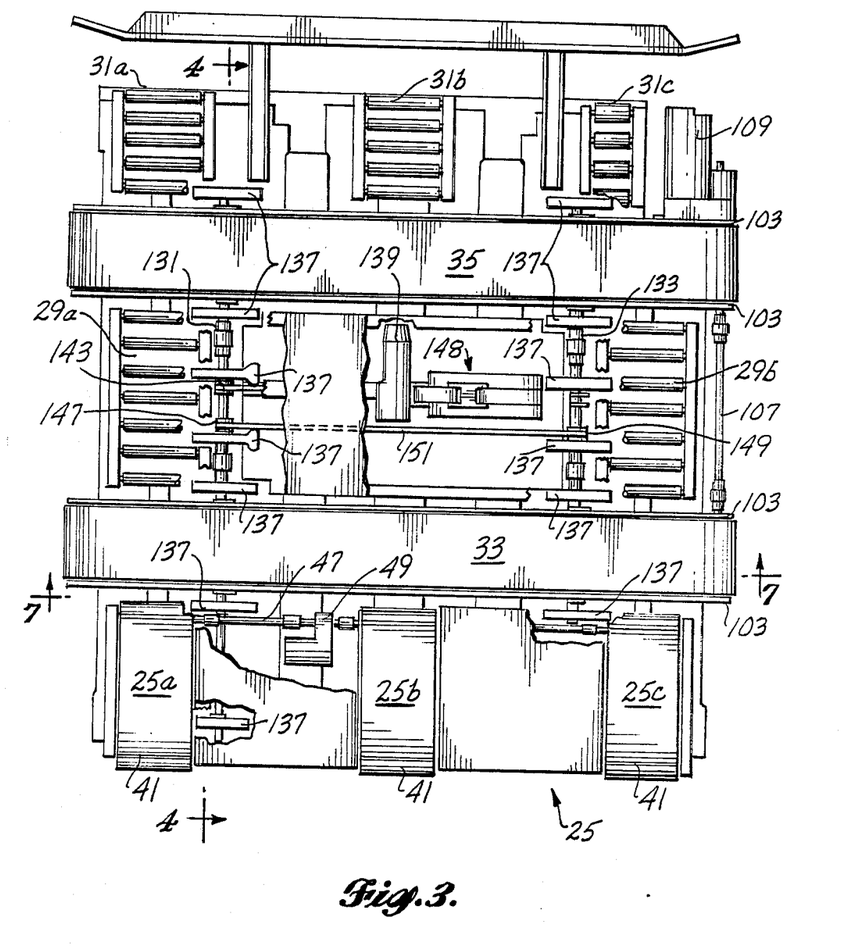
FIG. 3 is a plan view of the lower lobe cargo transfer platform conveyor system illustrated in FIG. 2.

As illustrated in FIGS. 2 and 3, preferably, the lateral belt conveyor mechanism includes three spaced-apart conveyors 25a, 25b and 25c. The conveyors each include a belt 41 positioned for lateral movement with respect to the entryway 17 of the lower lobe compartment 11. The lateral conveyors 25a, 25b and 25c are joined at their inner ends by connecting shafts 47a and 47b. One of the connecting shafts 47a is rotated by a lateral gear motor 49. The lateral gear motor 49 includes an electric motor and a gearbox for connecting the shaft of the electric motor of the coupling shaft 47a. The spaces between the spaced-apart lateral conveyors 25a, 25b and 25c are covered by cover plates 51 and 53 whose surfaces lie coplanar with, or slightly below, the upper surfaces of the belts 41 of the lateral conveyors.

Figures 5, 6:
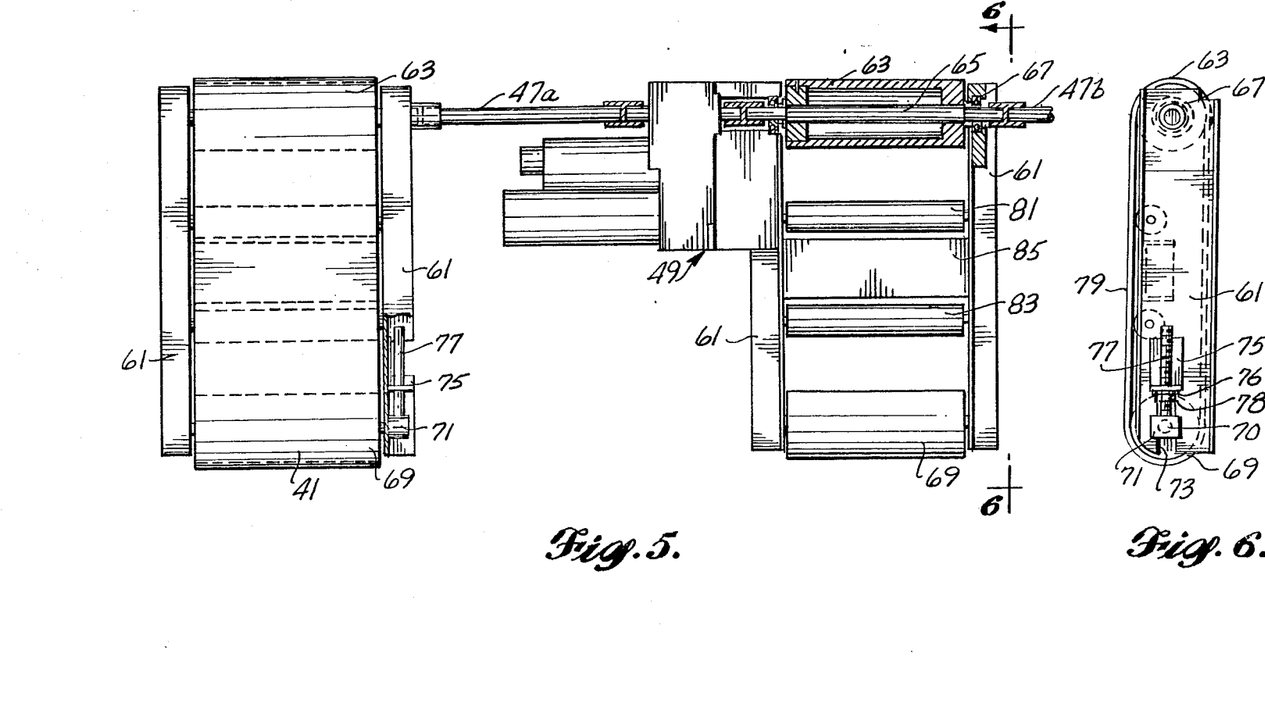
FIG. 5 is an enlarged plan view of a portion of the lateral conveyor mechanism of the lower lobe cargo transfer platform conveyor system illustrated in FIG. 2.
FIG. 6 is a cross-sectional view along line 6—6 of FIG. 5.

As illustrated in FIGS. 5 and 6, in addition to a belt 41, each of the lateral conveyors includes a pair of parallel oriented frame elements 61, which may be formed by channels. Located in a fixed position at one end of the frame elements 61 is a first large hollow roller 63. For ease of understanding, the belt is not shown in the view of the lateral conveyor located on the right side of FIG. 5. As shown there the large hollow roller 63 includes a central shaft 65 mounted in bearings 67 that, in turn, are mounted on the frame elements 61. The shafts 65 of the first large hollow rollers 63 are coupled together by the connecting shafts 47a and 47b. Located at the other end of each pair of frame elements 61 is a second large hollow roller 69. The lateral position of the second large hollow roller with respect to the first large hollow roller is adjustable to provide control of the tautness of the belts, which are wrapped around both large rollers. More specifically, the shaft 70 of the second large hollow roller 69 is mounted in bearing blocks 71 that, in turn, are mounted in slots 73 formed in the frame elements 61. The slots 73 lie along an axis that intersects the shaft 65 of the first large hollow roller 63. Mounted on the frame elements 61, inwardly of the slots 63, are L-shaped brackets 75 that support threaded bolts 77 or some other suitable adjustment mechanism. More specifically, one leg of the L-shaped bracket 75 is attached to the outer face of the web of the related frame element 61. The other leg of the L-shaped bracket extends outwardly from the frame element 61 in a plane that lies perpendicular to the related slot 73. The bolts 77 are threaded through adjustment nuts 76 that impinge on the outwardly extending leg of the related L-shaped bracket. The bolts are locked in place by lock nuts 78. The outer ends of the bolts impinge on the related bearing block 71. As a result, rotation of the adjustment nuts 76 moves the bearing blocks 71 inwardly and outwardly to adjust the lateral position of each second large hollow roller 69 with respect to the position of its related first large hollow roller 63. Thus, the tautness of the related belt 41 is adjustable. After the desired position is reached the lock nuts 78 are tightened against the adjustment nuts 76.

Extending crosswise between the frame elements 61, beneath the upper path of travel of the conveyor belt 41, are a pair of spaced-apart small rollers 81 and 83. Located between the small rollers 81 and 83 is a supporting channel 85 that also extends crosswise between the frame elements 61. The small rollers and the support channel support the conveyor belt 41 as it moves along its upper path of travel and, thus, support containers moved by the conveyor belt.

As will be appreciated from the foregoing description, when the lateral gear motor 49 is energized to rotate the shafts 47a and 47b to which it is coupled, the first large rollers 63 of all of the lateral conveyors 25a, 25b and 25c are all simultaneously rotated. As a result, the conveyor belts 41 of all three lateral conveyors are moved in the same direction. The direction of conveyor belt movement is controlled by the direction of rotation of the shaft of the lateral gear motor 49.

As illustrated in FIGS. 2 and 3, the midrollers 29 are formed by two sets of midrollers 29a and 29b located between the first and second longitudinal conveyors 33 and 35. The sets of midrollers 29a and 29b are located at opposite ends of the first and second longitudinal conveyors 33 and 35, in alignment with the end lateral conveyors 25a and 25c. The axes of rotation of the rollers lie parallel to the axes of rotation of the large hollow rollers 63 and 69 that support and move the belts 41 of the lateral conveyors. Located in the space between the two sets of midrollers 29a and 29b are the main elements of a mechanism for raising and lowering the longitudinal conveyors 33 and 35 in the manner hereinafter described. The mechanism is covered by a cover plate 95.

As also illustrated in FIGS. 2 and 3, the interior rollers 31 comprise three sets of interior rollers 31a, 31b and 31c. The three sets of interior rollers 31a, 31b and 31c are located on the opposite side of the second longitudinal conveyor 35 from the sets of midrollers 29a and 29b. The three sets of interior rollers 31a, 31b and 31c are spaced apart with the outer sets 31a and 31c being generally aligned with the outside lateral conveyors 25a and 25c and the center set 31b being aligned with the center lateral conveyor 25b. The axes of rotation of the three sets of interior rollers 31a, 31b and 31c lie parallel to the axes of rotation of the two sets of mid rollers 29a and 29b.

Each of the longitudinal conveyors 33 and 35 include a pair of parallel oriented, elongate frame elements 103. Journaled at one end of each pair of frame elements 103 is a first large roller 105. A coupling shaft 107 connects the first large rollers 105 of the longitudinal conveyors 33 and 35 together. Located on the interior side of the second longitudinal conveyor 35 is a longitudinal gear motor 109 connected to the first large roller 105 of the second longitudinal conveyor 35. As a result, when the longitudinal gear motor is energized, the first large rollers of both of the longitudinal conveyors 33 and 35 are rotated.

Located on the other end of each pair of frame elements 103 are second large rollers 111. The second large rollers are laterally positionable with respect to the first large rollers. More specifically, the shafts of the second large rollers 111 are journaled in blocks 113 that, in turn, are slidably mounted in slots 115 formed in the ends of the frames 103. The slots lie orthogonal to the axis of rotation of the first large rollers 105. Mounted inwardly from the slots 115 on the outer faces of the frame elements 103 are L-shaped brackets 117. The L-shaped brackets include outwardly protruding legs that lie transverse to the axis of the slots 115. The legs support adjustment mechanisms 119 that include shafts and nuts positioned to impinge on the blocks 113 and the L-shaped brackets in the manner illustrated in FIG. 6 and described above. Since the position of the shafts controls the position of the blocks 113 along the slots 115, the position of the shafts controls the distance between the first and second large rollers 105 and 111.

Wrapped around the first and second large rollers 105 and 111 of each of the longitudinal conveyors 33 and 35 is a conveyor belt 121. Mounted on the frame elements 103, near the upper edge thereof, so as to span the space between the framed elements are a plurality of small upper rollers 123. Located between some of the small upper rollers are transverse frame elements 125. The small upper rollers 123 and the transverse frame elements 125 support the conveyor belt 121 as it moves along its upper path of travel.

Mounted transversely across the frame elements 103, inwardly from the large rollers 105 and 111, are a pair of lower small rollers 127. After leaving the large rollers 105 and 111, the belt 121 travels above the small lower rollers 127. As a result, the lower path of travel of the conveyor belt 121 lies above the path it would follow in the absence of the small lower rollers 127.

The mechanism for raising and lowering the first and second longitudinal conveyors 33 and 35 includes first and second shafts 131 and 133. The shafts lie inwardly of, and slightly below, the small lower rollers 127 that define the lower path of travel of the conveyor belts 121 of the first and second longitudinal conveyors 33 and 35. Further, the shafts lie beneath the frames 103 of the first and second longitudinal conveyors 33 and 35 and pass through sinusoidal-shaped regions 135 formed in the lower edges of the frames 103. More specifically, the sinusoidal regions include a half-sinusoid indentation and a half-sinusoid protrusion. The shafts 131 and 133 pass through the half-sinusoid indentations. The shafts 131 and 133 are supported by a plurality of pillow blocks 137 mounted on opposite sides of the first and second longitudinal conveyors 33 and 35 and between the longitudinal conveyors 33 and 35.

Figure 8:
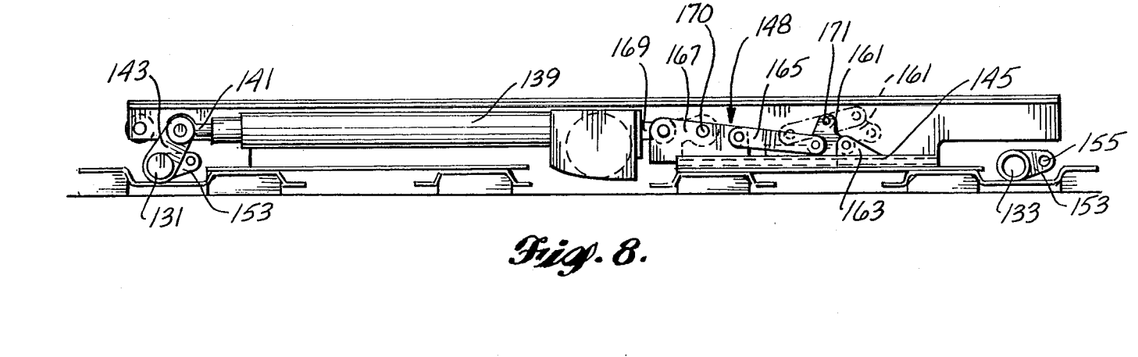
FIG. 8 is an enlarged, side elevational view of the linear actuator mechanism that raises and lowers the longitudinal conveyor mechanism that forms part of the lower lobe cargo transfer platform conveyor system illustrated in FIG. 2.

As previously noted, the main elements of the mechanism for raising and lowering the first and second longitudinal conveyors 33 and 35 are located in the region between the first and second longitudinal conveyors 33 and 35 and between the sets of midrollers 29a and 29b. The portion of the raising and lowering mechanism located in this region includes a linear actuator 139 whose shaft 141 is rotatably connected to an actuator yoke 143 affixed to the first shaft 131, as best seen in FIG. 8. The actuator yoke 143 is positioned adjacent one of the pillow blocks 137. The housing of the linear actuator 139 is attached to a bracket 145 by a delatching mechanism 148, which is described below.

Figure 4:
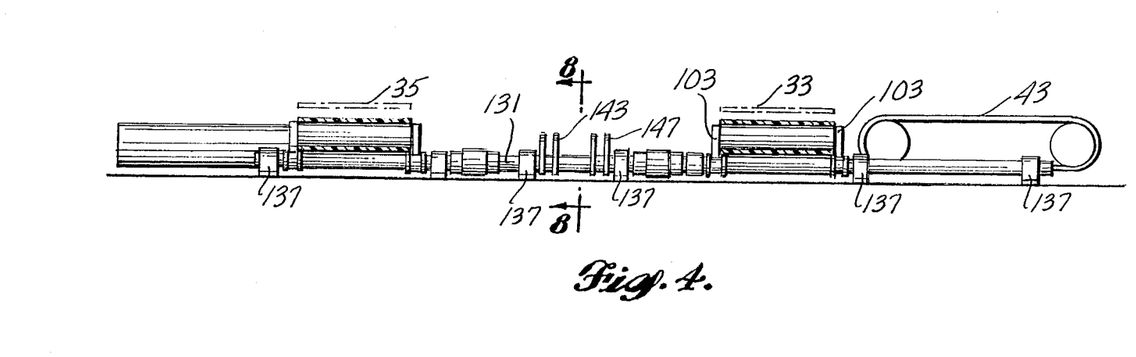
FIG. 4 is a cross-sectional view of the lower lobe cargo transfer platform conveyor system illustrated in FIG. 2 taken along line 4—4.

Also affixed to the first shaft 131 is a coupling yoke 147 (FIG. 4). A rod 151 connects the coupling yoke 147 mounted on the first shaft 131 to a coupling yoke 149 mounted on the second shaft 133. Preferably, both coupling yokes 147 and 149 are located adjacent to a related pillow block 137. The radial positions of the actuator yoke 143 and the coupling yokes 147 and 149 are the same. When the linear actuator 139 is energized, its shaft 141 extends, as shown by dashed lines in FIG. 8. Extension of the shaft 141 of the linear actuator 139 causes the first shaft 131 to rotate. Because the second shaft 133 is attached to the first shaft 131 by the rod 151 and the coupling yokes 147 and 149, rotation of the first shaft 131 causes a similar rotation of the second shaft 133.

Figure 7:
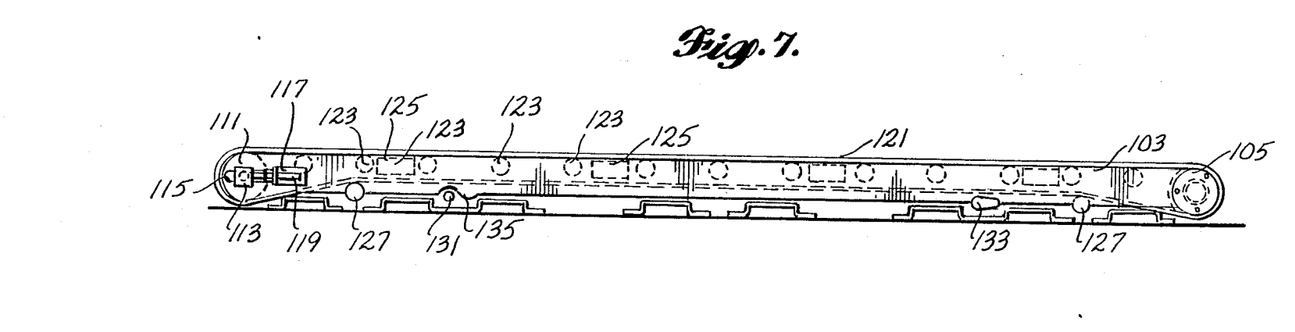
FIG. 7 is a cross-sectional view along line 7—7 of FIG. 3.
Figure 9:
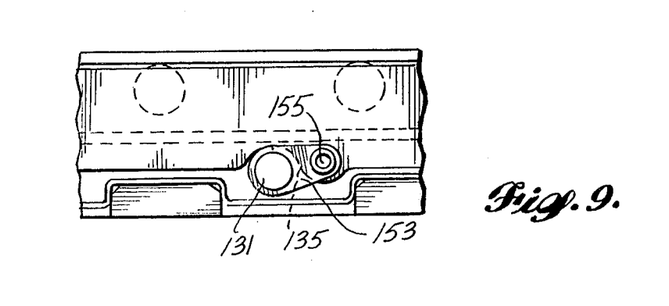
FIG. 9 is an enlarged view of a portion of FIG. 8.

Mounted on the first and second shafts 131 and 133 are pairs of frame yokes 153. The pairs of frame yokes 153 are positioned such that one of each pair is located on each side of the frame elements 103 where the shafts pass beneath the frame elements. More specifically, the frame yokes are positioned so as to lie on either side of the half sinusoid protrusion of the sinusoidal regions 135. (Frame yokes are not shown on the left side of FIG. 7 so that the sinusoidal region can be seen.) As best shown in FIG. 9, rods 155 passing through apertures in the frame yokes and the half sinusoid protrusions rotatably attach the frame yokes 153 to the frame elements 103.

Since the frame yokes 153 are affixed to the first and second shafts 131 and 133, when the first and second shafts are rotated in a manner heretofore described, the frame yokes 153 are also rotated. Depending upon the direction of rotation of the first and second shafts 131 and 133 and, thus, the movement of the frame yokes 153 either raises or lowers the frame elements 103. When the frames are in their raised position the upper path of travel of the conveyor belts 121 of the first and second longitudinal conveyors 33 and 35 lies above the upper path of travel of the conveyor belts 41 of the lateral conveyors 25a, 25b and 25c and above the mid and interior sets of rollers 29a and 29b and 31a, 31b and 31c. Since the conveying surfaces of the conveyor belts 121 of the first and second longitudinal conveyors 33 and 35 lie above the conveying surfaces of the conveyor belts 41 of the lateral conveyors 25a, 25b and 25c and above the mid and inside rollers 29 and 31, energization of the longitudinal gear motor 109 causes containers supported by the conveyor belts of the longitudinal conveyors to move cargo containers toward or away from the cargo transfer platform system in the direction of the longitudinal axis of the aircraft's fuselage 13. Alternatively, when the frame elements 103 are in their lower position, the upper path of travel of the conveyor belts 121 of the longitudinal conveyors 33 and 35 lies below the upper path of travel of the conveyor belts 41 of the lateral conveyors 25a, 25b and 25c. In this instance, energization of the lateral conveyors moves cargo containers toward or away from the cargo transfer platform conveyor system through the entryway, i.e., in a direction transverse to the longitudinal axis of the aircraft's fuselage.

As previously described, the housing of the linear actuator 139 is attached to a bracket 145 by a delatching mechanism 148. The bracket is rigidly attached to the floor of the lower lobe compartment 11 either directly or indirectly. The delatching mechanism is provided to allow the first and second longitudinal conveyors 33 and 35 to be manually lowered in the event that they become stuck in the up position. In essence, the delatching mechanism 148 comprises an over center link assembly. The over center link assembly is best shown in FIG. 8 and includes a triangular-shaped link 161 having one corner pinned to a yoke 163 affixed to the bracket 145. A second corner of the triangular link 161 is pinned between a pair of legs of a H-shaped link 165. The third corner of the triangular link is unconnected and extends upwardly. The third corner includes a hole 171 suitable for receiving a pin or rod of a release tool.

The other pair of legs of the H-shaped link 165 are pinned to one end of a slide block 167 mounted in a track formed in the bracket 145. The other end of the slide block 167 is pinned to a protrusion 169 extending outwardly from the housing of the linear actuator 139.

When the triangular link 161 is in a down position, the pivot position of the H-shaped link 165 is aligned with the pin 170 that pins the protrusion 169 to the slide block 167. The line along which all of these rotation points lie, when extended, lies slightly below the rotation point between the triangular link 161 and the fixed yoke 163. Consequently, the links are in an off-center, down position. When the triangular link 161 is pulled upwardly it rotates to the dotted position illustrated in FIG. 8. This rotation pulls the H-shaped link 165 toward the fixed yoke 163. As a result, the slide block 167 is pulled toward the yoke 163. This movement results in the entire linear actuator 139 moving toward the slide block 167 counteracting the extension created by the extended shaft 141 of the linear actuator 139. As a result, the yoke 143 that attaches the acuator shaft 141 is rotated clockwise as viewed in FIG. 8 from the longitudinal conveyor raised position to the longitudinal conveyor lowered position. Thus, the first and second longitudinal conveyors 33 and 35 drop from their raised position to their lowered position. In this way, jamming the actuator in the extended position is alleviated and cargo lowered to a position where it can be unloaded using the lateral conveyors 25a, 25b and 25c and the mid and interior rollers 29a and 29b and 31a, 31b and 31c.

The longitudinal conveyors can be raised manually, after being tripped, by rotating the first shaft 131 using a wrench or socket. The wrench or socket is applied to a nut shape formed in the outer end of the shaft underlying one of the cover plates 51. See FIG. 3.

In order to prevent the lateral gear motor 49 from operating when the longitudinal conveyors are up and to prevent the longitudinal conveyors from operating when they are down, limit switches are provided. Some limit switches are positioned to sense when the longitudinal conveyors are up and down. Other limit switches are positioned to sense when the linear actuator is in the longitudinal conveyor up and down positions. Since the location of the limit switches is not critical to the operation of the invention, because various locations can be chosen, the limit switches are not illustrated in FIGS. 1-9. Rather, only an electrical schematic (FIG. 10) illustrating the connection of the limit switches in a control circuit suitable for controlling the application of power to the lateral gear motor 49, the longitudinal gear motor 109 and the linear actuator 139 is provided.

Figure 10:
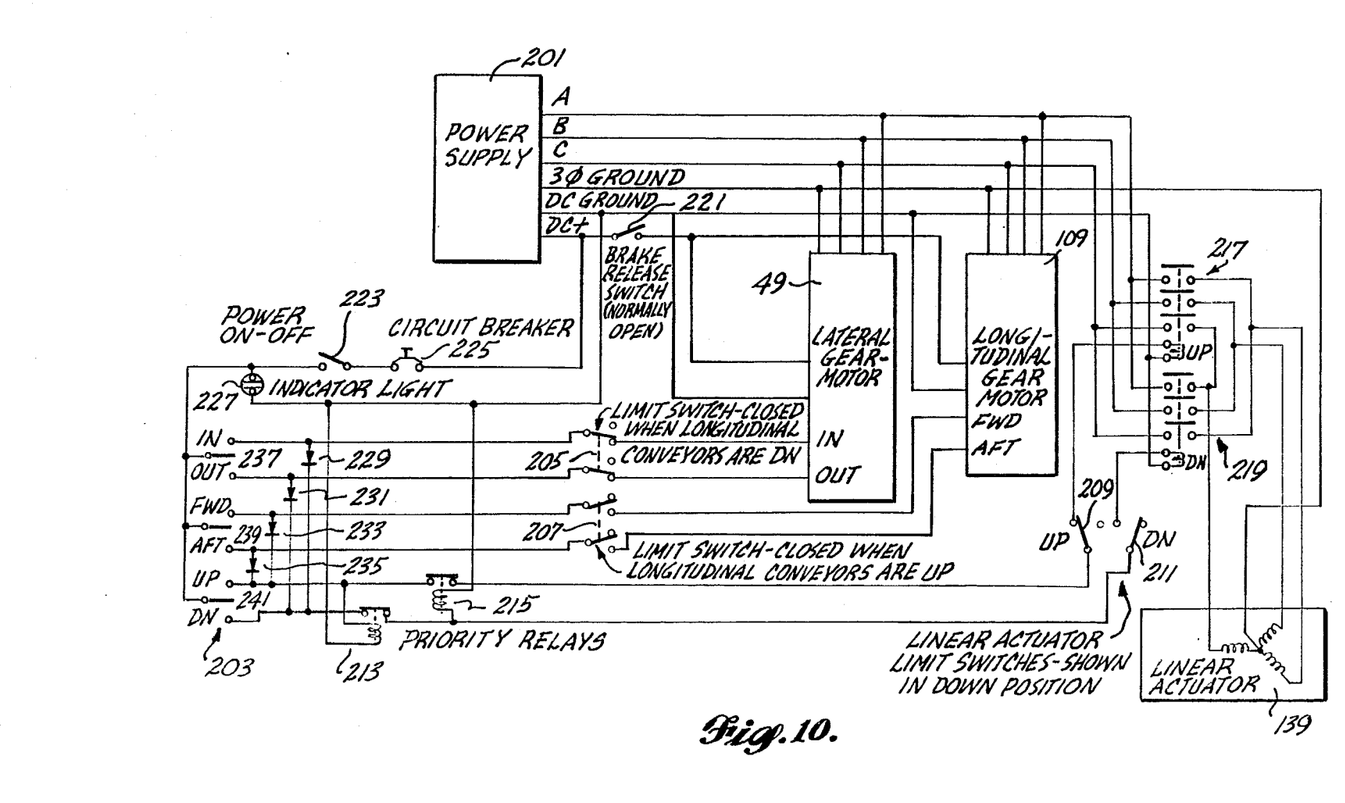
FIG. 10 is a block diagram of an electrical control circuit for controlling the application of power to the linear actuator and the lateral and longitudinal conveyor mechanisms of the lower lobe cargo transfer platform conveyor system illustrated in FIG. 2.

In addition to the lateral gear motor 49, longitudinal gear motor 109 and linear actuator 103, the control circuit illustrated in FIG. 10 includes: a power supply 201; a series of control switches 203; a lateral gear motor limit switch 205; a longitudinal gear motor limit switch 207; up and down linear actuator limit switches 209 and 211; first and second priority relays 213 and 215; up and down linear actuator relays 217 and 219; a brake release switch 221; a power on/off switch 223; a circuit breaker 225; indicator light 227; and, four diodes 229, 231, 233 and 235. The control switches include: an in/out switch 237; a forward/aft switch 239; and, an up/down switch 241. The lateral and longitudinal gear motor limit switches 205 and 207 are double pole, single throw connected switches. The lateral gear motor limit switch 205 is closed when the longitudinal conveyors are down. The longitudinal gear motor limit switch 207 is closed when the longitudinal conveyors are up. The priority relays 213 and 215 each include a set of contacts that are normally closed. The up and down linear actuator relays 217 and 219 each include three sets of normally open contacts. The power supply 201 produces both three-phase AC power and DC power. Finally, preferably, the in/out and forward/aft switches 237 and 239 are combined in a joystick switch mechanism that allows only one of the four available switch positions to occur at a time.

The three phases of the AC power produced by the power supply, designated A, B and C, are each connected to one side of the normally open contacts of the up and down linear actuator relays 217 and 219. The other sides of the contacts are connected to the power terminals of the linear actuator 139. The common terminal of the linear actuator 139 is connected to the three-phase ground of the AC power supply 201. The three phases of the AC power supply, and the three-phase ground are also connected to the power inputs of the lateral gear motor 49 and the longitudinal gear motor 109. The lateral and longitudinal gear motors include relays similar to the up and down linear actuator relays that control the phase of power applied to three-phase windings to control the direction of motor shaft rotation in accordance with the nature of the hereinafter described in/out and forward/aft control signals.

The DC ground of the power supply 201 is connected to the lateral gear motor 49, the longitudinal gear motor 109 and one side of the coils of the up and down linear actuator relays 217 and 219. The DC ground is also connected to one side of the interrupting relays 213 and 215 and, one side of the indicator light 227. The +DC output of the power supply 201 is connected through the brake release switch (which is normally open) to the lateral gear motor 49 and the longitudinal gear motor 109. The +DC output of the power supply 201 is also connected through the circuit breaker 225 to one side of the power on/off switch 223. The other side of the power on/off switch 223 is connected to the other side of the indicator light 227 and to the common terminals of the in/out switch 237, the forward/aft switch 239 and the up/down switch 241. The in side of the in/out switch 237 is connected to the anode of the first diode 229 and to the common terminal of one side of the lateral gear motor limit switch 205. The cathode of the first diode 229 is connected to the down side of the up/down switch 241. The out side of the in/out switch 237 is connected to the anode of the second diode 231 and to the common terminal of the other side of the lateral gear motor limit switch 205. The cathode of the second diode 231 is connected to the down side of the up/down switch 241. A related pair of switch terminals of the lateral gear motor limit switch 205 are connected to the in and out control inputs of the lateral gear motor 49, one to each control input. The other switch terminals of the lateral gear motor limit switch are unconnected. As discussed above, and noted in FIG. 10, the lateral gear motor limit switch 205 is closed when the longitudinal conveyors are in their down position. The switch connections are such that when the longitudinal conveyors are down, the in side of the in/out switch 237 is connected to the in control terminal of the lateral gear motor 49 and the out side of the in/out switch 237 is connected to the out control terminal. As soon as the longitudinal conveyors begin moving up, the lateral gear motor limit switch 205 disconnects the in and out sides of the in/out switch 237 from the in and out terminals of the lateral gear motor 49.

The forward side of the forward/aft switch 239 is connected to the anode of the third diode 233 and to the common terminal of one side of the longitudinal gear motor limit switch 207. The cathode of the third diode is connected to the up side of the up/down switch 241. The aft side of the forward/aft switch 239 is connected to the anode of the fourth diode 235 and to the common terminal of the other side of the longitudinal gear motor limit switch 207. The cathode of the fourth diode is connected to the up side of the up/down switch 241. A related pair of terminals of the longitudinal gear motor limit switch 207 are connected to the forward and aft control inputs of longitudinal gear motor 109, such that the forward control terminal is connected to the forward side of the forward/aft switch 239 and the aft control terminal is connected to the aft side of forward-/aft switch 239 when the longitudinal gear motor limit switch is closed.

The up side of the up/down switch 241 is also connected to the other side of the coil of the first priority relay 213 and to one of the contact of the second priority relay 215. The down side of the up/down switch is connected to the other side of the coil of the second priority relay 215 through the contacts of the first priority relay 213. The other terminal of the contact of the second priority relay 215 is connected to the common terminal of the up linear actuator limit switch 209 and the terminal of the contact of the first priority relay 213 remote from the down side of the up/down switch 241 is connected to the common terminal of the down linear actuator limit switch 211. The terminal of the up linear actuator limit switch that is closed when the linear actuator is in the down position and when the linear actuator is changing positions is connected to the other side of the coil of the up relay 217. The terminal of the down linear actuator limit switch 211 that is closed when the linear actuator is in the up position and when the linear actuator is changing positions is connected to the other side of the coil of the down relay 219.

The lateral gear motor limit and the longitudinal gear motor limit switches 205 and 207 are shown in FIG. 10 in the longitudinal conveyor down position. As a result, the in and out sides of the in/out switch 237 are connected to the in and out terminals of the lateral gear motor 49 and the forward and aft sides of the forward-/aft switch 239 are disconnected from the forward/aft inputs of the longitudinal gear motor 109. Further, because the longitudinal conveyor is in the down position, the linear actuator is in the down position. As a result, as also shown in FIG. 10, the up side of the up/down switch is connected by the up limit switch 209 to the coil of the linear actuator up relay 217. The down side of the up/down switch 241 is disconnected from the coil of the down relay 219 by the down limit switch 211. Thus, when the longitudinal conveyor is down the lateral gear motor is connected to receive in and out control signals, the longitudinal gear motor is prohibited from receiving forward and aft control signals, the up relay is configured to receive an up control signal and the down relay is prevented from receiving a down control signal. Because the lateral gear motor can receive in and out signals, cargo containers can be moved through the entryway to a position above the longitudinal conveyors or from a position above the longitudinal conveyors through the entryway. This is accomplished by moving the actuator of the in/out switch to connect its common terminal to either the in terminal or the out terminal. Such movement causes a control signal to be applied to the related in or out terminal of the lateral gear motor 49 causing in or out movement of the conveyor belts 41 of the lateral conveyors 25a, 25b and 25c. Movement of the actuator of the forward/aft switch, even if the in/out and forward/aft switches are not part of a joystick mechanism that only allows one closure at a time, has no effect on the longitudinal gear motor and, thus, the longitudinal conveyors because the longitudinal gear motor limit switch 207 is open. Movement of the up/down switch to the down position has no affect because the down linear actuator limit switch is open. Even if the down linear actuator limit switch were closed for some reason, movement of the up/down switch to the down position would have no affect when the in/out switch is in the in or out positions because the contacts of the second priority relay 215 would be open as a result of current flow to the coil of that relay via the related one of the first and second diodes. Thus, the only other action that can be taken is to move the up/down switch to the up position. If the up/down switch is moved to the up position, the coil of the up relay 217 is energized. As a result, the contacts of the up relay are closed and apply power to the linear actuator causing the linear actuator to raise the first and second longitudinal conveyors 33 and 35 in the manner heretofore described. At the same time, the first priority relay 213 is energized to open its contacts. Thus, power cannot be applied to the coil of the down relay 219 when the up relay coil is being energized even though the down limit switch 211 closes as soon as the linear actuator begins changing position. More specifically, when the longitudinal conveyors begin moving up, the down linear actuator limit switch 211 immediately closes to set up the system for receipt of a down control signal from the up/down switch 241. The first priority relay prevents the application of power to the down relay coil when this occurs. When the linear actuator reaches a position whereat the first and second longitudinal conveyors are up, the up linear actuator limit switch 209 opens.

During the period of time the longitudinal conveyors are being moved up, the lateral gear motor and longitudinal gear motor limit switches 205 and 207 are both open. More specifically, as soon as the longitudinal conveyors begin to rise, the lateral gear motor limit switch changes position. While the longitudinal conveyors are being raised, the longitudinal gear motor limit switch 207 remains open. As a result, neither the lateral nor the longitudinal conveyors can be energized when the longitudinal conveyors are being raised. When the longitudinal conveyors reach their up position, the longitudinal gear motor limit switch 207 closes. Thereafter, the aft/forward switch can be used to control the aft/forward rotation of the longitudinal gear motor 105 and, thus, the aft/forward movement of the first and second longitudinal conveyors 33 and 35.

When it is desired to lower the longitudinal conveyors 33 and 35, the up/down switch is moved to the down position. When this occurs, power is applied through the contact of the first priority relay 213 and the down linear actuator switch 211 to the coil of the down relay 219. The resulting power applied to the linear actuator causes the first and second longitudinal conveyors to be lowered. At the same time, power applied to the coil of the second priority relay 215 by the down positioning of the up/down switch causes the contact of that relay to open to ensure that no power can be applied to the coil of the up relay 217 even though the up linear actuator switch should be open when down movement starts. Since the up linear actuation limit switch closes shortly after the longitudinal conveyors start to move down, the open second priority relay contacts also prevent the application of power to the up relay coil while power is being applied to the down relay coil. Thus, the priority relays prevent power from being applied to the other up or down relay when power is being applied to one of the up or down relays during the period when the coils of either could be energized, i.e., when the longitudinal conveyors are in any position intermediate their up and down position.

As soon as the longitudinal conveyors begin moving down, the longitudinal gear motor limit switch 207 opens. Thus, like when the longitudinal conveyors are moving up, control signals cannot be applied by the in/out and forward/aft switches 237 and 239 to either the lateral gear motor 49 or the longitudinal gear motor 109 while the longitudinal conveyors are moving down.

The indicator light, of course, indicates when the power on/off switch is closed to apply power to the control circuit. The brake release switch 211 is provided to electrically release the brakes of the lateral and longitudinal gear motors as needed during testing and maintenance operations. Further, if AC power is off the brake release switch allows containers to be manually unloaded. In this regard, the brakes are an integral part of the lateral and longitudinal gear motors. The brakes are released by DC current when power is suppled to the motors.

As can be readily appreciated from the foregoing description, the invention provides a lower lobe cargo transfer platform conveyor system designed to allow maximum-sized containers to be moved through the entryway of an aircraft and directed to forward and aft conveyors that move the container to its final transportation destination in the aircraft lower lobe. The lower lobe cargo transfer platform is also designed to receive stored cargo and move it through the entryway of the aircraft during unloading.

While a preferred embodiment of the invention has been illustrated and described, it will be appreciated that various changes can be made therein without departing from the spirit and scope of the invention. Consequently, the invention can be practiced otherwise than as specifically described herein.

The embodiments of the invention in which an exclusive property or privilege is claimed are defined as follows:

1. A cargo transfer platform for transversely changing the direction of movement of cargo containers at a junction comprising:

lateral conveyor means for moving cargo containers in a first direction, said lateral conveyor means including a plurality of belt conveyors located along one edge of said cargo transfer platform, each of said belt conveyors comprising a wide belt and a plurality of rollers for supporting the upper surface of the wide belt;

longitudinal conveyor means interspersed with said lateral conveyor means for moving said cargo containers in a second direction transverse to said first direction, said longitudinal conveyor means including a plurality of belt conveyors, each of said belt conveyors comprising a wide belt and a plurality of rollers for supporting the upper surface of the wide belt;

raising and lowering means associated with one of said lateral and longitudinal conveyor means for vertically raising and lowering the conveying surface of said one of said lateral and longitudinal conveyor means between a first horizontal level and a second horizontal level; and, a control system for controlling the energization of said lateral and longitudinal conveyor means such that said lateral and longitudinal conveyor means cannot be energized when said one of said lateral and longitudinal conveyor means is being raised or lowered and such that only the upper one of said lateral and longitudinal conveyor means can be energized.

2. A cargo transfer platform for transversely changing the direction of movement of cargo containers at a junction comprising:

lateral conveyor means for moving cargo containers in a first direction, said lateral conveyor means including a plurality of belt conveyors located along one edge of said cargo transfer platform, each of said belt conveyors comprising a wide belt and a plurality of rollers for supporting the upper surface of the wide belt;

longitudinal conveyor means interspersed with said lateral conveyor means for moving said cargo containers in a second direction transverse to said first direction, said longitudinal conveyor means including a plurality of belt conveyors, each of said belt conveyors comprising a wide belt and a plurality of rollers for supporting the upper surface of the wide belt;

a plurality of sets of rollers forming part of said lateral conveyor located between said plurality of longitudinal belt conveyors; and, raising and lowering means associated with said longitudinal conveyor means for vertically raising and lowering the conveying surface of said longitudinal belt conveyors between a first horizontal level and a second horizontal level.

3. A cargo transfer platform as claimed in claim 2 wherein said plurality of longitudinal belt conveyors equals two.

4. A cargo transfer platform as claimed in claim 3 including a control system for controlling the energization of said lateral and longitudinal conveyor means such that said lateral and longitudinal conveyor means cannot be energized when said two longitudinal belt conveyors are being raised or lowered and wherein only said lateral conveyor means can be energized when said longitudinal belt conveyors are fully down and only said longitudinal conveyor means can be energized when said longitudinal belt conveyors are fully up.

5. A cargo transfer platform as claimed in claim 3 wherein said lateral belt conveyors are located along an exterior edge of one of said two longitudinal belt conveyors and wherein said plurality of sets of rollers include mid sets of rollers located between said two longitudinal belt conveyors and interior sets of rollers located along the outer edge of the other of said two longitudinal belt conveyors.

6. A cargo transfer platform as claimed in claim 5 including a control system for controlling the energization of said lateral and longitudinal conveyor means such that said lateral and longitudinal conveyor means cannot be energized when said longitudinal belt conveyors are being raised or lowered and wherein only said lateral conveyor means can be energized when said longitudinal belt conveyors are fully down and only said longitudinal conveyor means can be energized when said longitudinal belt conveyors are fully up.

7. A cargo transfer platform as claimed in claim 5 wherein said two longitudinal belt conveyors include: side frames; raising and lowering shafts located between said side frames; frame yokes for attaching said side frames to said raising and lowering shafts; and, linear actuator means coupled to said raising and lowering shafts for rotating said raising and lowering shafts to thereby rotate said yokes and cause said frames to raise and lower.

8. A cargo transfer platform as claimed in claim 7 including a control system for controlling the energization of said lateral and longitudinal conveyor means such that said lateral and longitudinal conveyor means cannot be energized when said longitudinal belt conveyors are being raised or lowered and wherein only said lateral conveyor means can be energized when said longitudinal belt conveyors are fully down and only said longitudinal conveyor means can be energized when said longitudinal belt conveyors are fully up.

* * * * *